US008264909B2

(12) United States Patent
Russo et al.

(10) Patent No.: US 8,264,909 B2
(45) Date of Patent: Sep. 11, 2012

(54) SYSTEM AND METHOD FOR DEPTH DETERMINATION OF AN IMPULSE ACOUSTIC SOURCE BY CEPSTRAL ANALYSIS

(75) Inventors: Donato M. Russo, Hollywood, MD (US); Ronald Buratti, Drayden, MD (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 225 days.

(21) Appl. No.: 12/698,679

(22) Filed: Feb. 2, 2010

(65) Prior Publication Data

US 2011/0188350 A1 Aug. 4, 2011

(51) Int. Cl.
*G01S 3/80* (2006.01)
*G10K 11/00* (2006.01)

(52) U.S. Cl. ........................................ 367/118; 367/141

(58) Field of Classification Search .................. 367/118, 367/141

See application file for complete search history.

(56) References Cited

U.S. PATENT DOCUMENTS 3,276,366 A * 10/1966 Johnson et al. ............... 181/116
5,012,453 A * 4/1991 Katz ............................... 367/57
5,019,978 A 5/1991 Howard et al.
5,054,072 A * 10/1991 McAulay et al. ............. 704/207
5,195,138 A * 3/1993 Kane et al. .................... 704/246
6,427,536 B1 8/2002 Sinha
2002/0032566 A1* 3/2002 Tzirkel-Hancock et al. . 704/241
2002/0080138 A1* 6/2002 Tarr .............................. 345/441

OTHER PUBLICATIONS

Satish, A.; Kashyap, R.L.; , "Maximum likelihood estimation and Cramer-Rao bounds for direction of arrival parameters of a large sensor array," Antennas and Propagation, IEEE Transactions on , vol. 44, No. 4, pp. 478-491, Apr. 1996.*

D. R. Baumgardt, A. Freeman., "Characterization of Underwater Explosions by Spectral/Cepstral Analysis, Modeling and Inversion". Def. Threat Red. Agency., DTRA-TR-02-6., May 2005., 129 pages.*

Gromasheva, et al., "Estimation of the Underwater Explosion Depth from the Modified Cepstral Analysis of Sea Reverberation," Acoustical Physics, vol. 48, Nr. 3, 2002. pp. 273-278, Translated from Akusticheskit Zhurnal, vol. 48, No. 3. pp. 319-324, Russia.

Childers, et al., "The Cepstrum: A Guide to Processing," Proceedings the IEEE, vol. 65, No. 10, Oct. 1977, USA.

* cited by examiner

*Primary Examiner* — Isam Alsomiri
*Assistant Examiner* — James Hulka
(74) *Attorney, Agent, or Firm* — Mark O. Glut; Mark D. Kelly

(57) ABSTRACT

A system and method for making an accurate estimate of the activation depth for an impulse acoustic source includes recording sounds produced by the activation of the underwater impulse acoustic source over a time period sufficient to capture reverberation, performing a cepstral scan of the recording to determine a quefrequency corresponding to the impulse from the underwater impulse acoustic source and deriving a depth estimate from the quefrequency corresponding to the impulse from the underwater impulse acoustic source.

8 Claims, 8 Drawing Sheets

SYSTEM AND METHOD FOR DEPTH DETERMINATION OF AN IMPULSE ACOUSTIC SOURCE BY CEPSTRAL ANALYSIS

GOVERNMENT INTEREST

The invention described herein may be manufactured, licensed, and used by or for the U.S. Government.

BACKGROUND

Active sonar systems create an acoustic impulse, and then listen for reflections of the impulse to detect the location of objects under the water such as hostile submarines and submerged mines, to detect the features of undersea terrain and to detect the presence of undersea gas and oil deposits. A variety of active sonar systems generate an acoustic impulse, such as a ping, from an electronic acoustic source located in the same place as the receiver. In other systems, however, the position of the acoustic source is spatially separated from the receiver. For example, an impulse acoustic source may be dropped from a ship or aircraft to a predetermined depth and activated. Such impulse acoustic sources are generally expendable and may include, for example, explosive charges, pneumatic devices, or electronic (sparker) signal generators. Small explosive charges are frequently used as impulse acoustic sources in airborne anti-submarine warfare (ASW) sonar systems because they are light in weight, compact, and provide good depth of penetration.

In cases where the detonation depth is extremely deep, explosive impulse acoustic sources have been modeled as free falling objects in a column of water and detonated with a pressure actuated fuse. The detonation depth tolerance of free falling explosive impulse acoustic sources is typically 10% of the depth setting. In practice, detonation depths are even more variable since older explosives can detonate at depths that are significantly outside of the 10% tolerance range. Although free falling explosive impulse acoustic sources have many advantages, the lack of accuracy in determining the depth of the explosion causes sonar measurements to be less accurate since source detonation depth is needed to achieve an acceptable tolerance on measured propagation loss estimates. Thus an accurate estimate of the activation depth for an impulse acoustic source is needed. Embodiments according to the present invention are directed to solving the foregoing problems.

SUMMARY

In general, in one aspect, a system and method for making an accurate estimate of the activation depth for an impulse acoustic source includes recording sounds produced by the activation of the underwater impulse acoustic source over a time period sufficient to capture reverberation, performing a cepstral scan of the recording to determine a quefrequency corresponding to the impulse from the underwater impulse acoustic source and deriving a depth estimate from the quefrequency corresponding to the impulse from the underwater impulse acoustic source. In another aspect according to the present invention, integration of a plurality of cepstral scans may be performed for improved signal to noise ratio and more accurate depth estimates.

BRIEF DESCRIPTION OF THE DRAWINGS

Exemplary embodiments according to the invention are illustrated in the accompanying drawings in which like reference numerals represent like parts throughout and in which.

DETAILED DESCRIPTION

In the following detailed description, reference is made to the accompanying drawings which are a part of this patent disclosure, and in which are shown by way of illustration specific embodiments in which the invention, as claimed, may be practiced. This invention may, however, be embodied in many different forms and should not be construed as limited to the embodiments set forth; rather, these embodiments are provided so that this disclosure will be thorough and complete, and will fully convey the scope of the invention to those skilled in the art.

For purposes of this patent disclosure, a bubble pulse is a characteristic oscillation that occurs when hot gas bubbles rise from an underwater explosion. The period of the oscillation depends on the size of the explosion and the depth of the detonation.

An equation exists which relates the bubble pulse period to explosive depth. The bubble pulse period and depth are related by:

$$T = \frac{Kw^{1/3}}{(d+33)^{5/6}}; \tag{1}$$

for a point change, where w equals charge weight in pounds, T is the bubble pulse period and d is the depth of the charge. The constant K is dependent on the composition of the explosive material and equals 4.36 for TNT.

This equation can be rearranged to solve for d, $$d = \left[\frac{Kw(1/3)}{T}\right]^{6/5} - 33 \tag{2}$$

Various attempts have been made to measure the bubble pulse period by cepstral processing. A cepstrum is defined as the Fourier transform of the logarithm of the absolute value of the source frequency spectrum. Accurate measurements of the bubble pulse period have not been achieved with conventional cepstral processing. In practice, the wave form produced by the bubble pulse is very short in duration so relatively few samples can be captured. Moreover, fluctuations in the transmission media, noise, bottom reflections and surface scattering affect the cepstrum and make it difficult to accurately measure the bubble pulse period from a single listening station. As will be described below, reverberations caused by the acoustic impulse may be used to advantage. Because they persist a great deal longer than the initial impulse, reverberations may be used to determine the bubble pulse period, and consequently, the depth of the detonation, to a high degree of accuracy.

Reverberation occurs whenever sound waves are reflected by a surface or another interface. In an embodiment according to the present invention a highly accurate estimate of the detonation depth of an underwater impulse acoustic source may be made by analyzing the reverberation generated by the source. The source of this reverberation is scattering that results from sound interactions with the surface of the sea, the volume through which the sound waves travel, and the sea bottom. This reverberation provides essential spectral characteristics that can be used to make accurate depth estimates by accurately determining the "bubble pulse" period.

Figure 1:
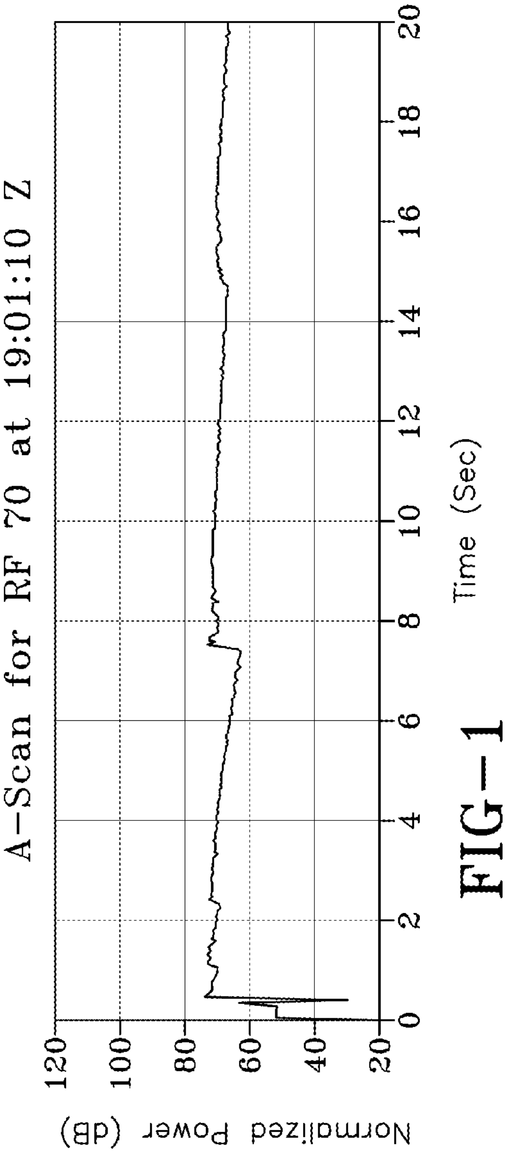
FIG. 1 is plot of received power versus time for an explosive charge detonated in the deep ocean.
Figure 2:
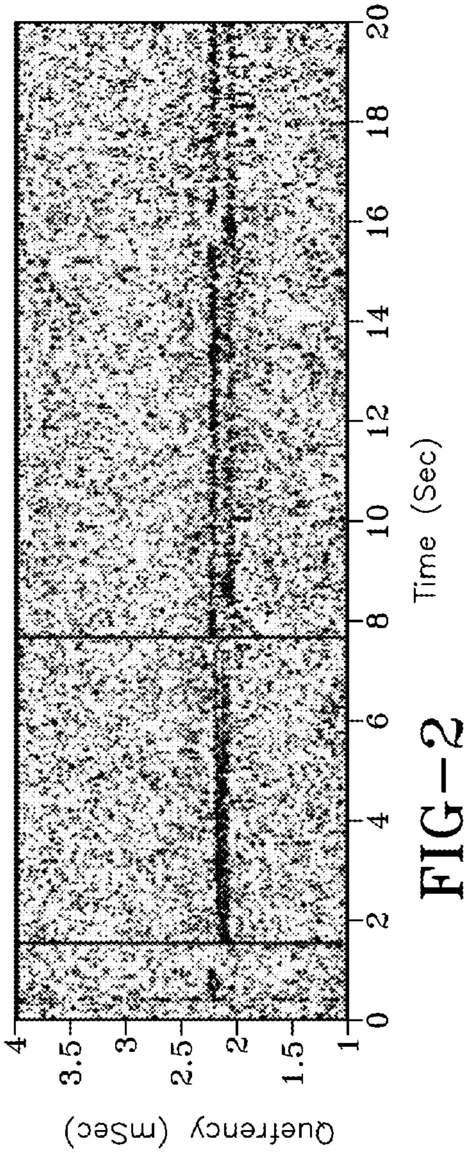
FIG. 2 is a plot of a Cepstrum-gram for an explosive charge detonated in the deep ocean.
Figure 3:
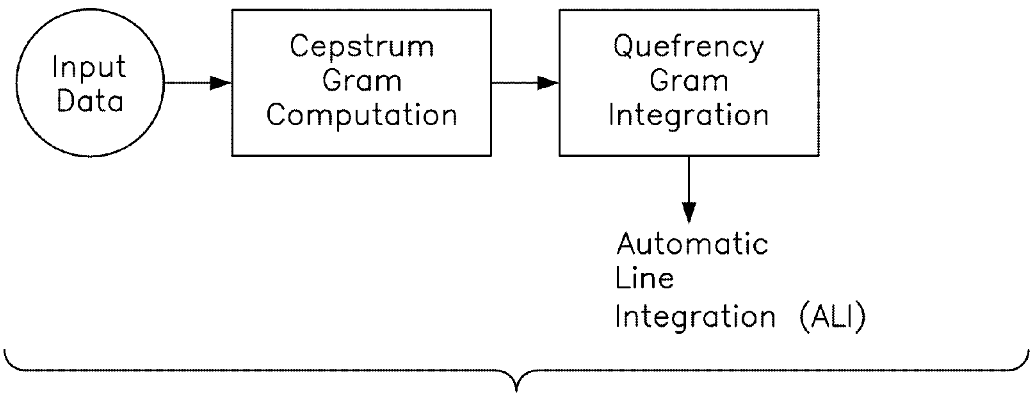
FIG. 3 shows a block diagram of a cepstrum integration process.
Figure 4:
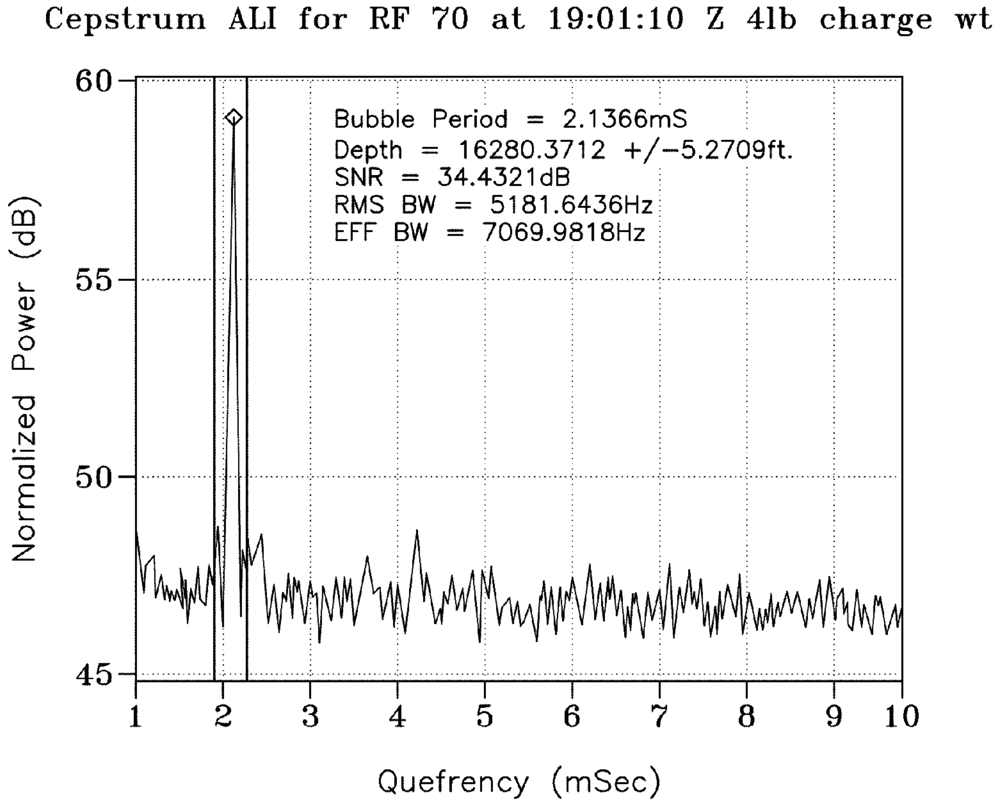
FIG. 4 is a plot of an example of a cepstrum Automatic Line Integration.

An example of how the cepstrum may be used to determine the quefrency (the independent variable of the cepstrum) of the reverberation is shown in FIGS. 1 and 2. FIG. 1 is the logarithm of the pressure signature for a deep explosive charge captured on a sonobuoy sensor. FIG. 2 is the cepstrum gram of the same data with the quefrency on the ordinate and time on the abscissa. Every 9.8 milli-seconds (ms) a cepstral scan is computed and output as a single graph line. The quefrency line beginning at approximately 2 ms is most prominent on the received direct blast in the interval from approximately 1.8 s to 7.8 s, bounded by the white vertical lines. Approximately 700 cepstrum scans are computed in this time interval. The quefrency may be used to measure the bubble pulse period and in this example, the quefrency of interest is 2 msec. Inserting this value into equation (2), the depth is found to be approximately 17,000 feet. Additional performance accuracy can be achieved by integrating the output of the individual cepstrum scans. The process for Automatic Line Integration of the cepstrum scans is outlined in FIG. 3. FIG. 4 shows a plot of the normalized power (dB) versus Quefrequency for the cepstrum ALI. In this example, a quefrency peak corresponding to the first bubble period is clearly evident at 2.13 ms. The quefrency corresponding to this peak is entered into Equation (2) and d is computed to be 16280 feet.

The integration process provide a significant increase in the output signal-to-noise ratio. As has been demonstrated, this increase in the signal-to-noise ratio of the integrated cepstrum scans greatly increases the accuracy of the depth estimate. The integration effectively reduces the statistical variance of the background due to noise and hence increases the accuracy of the estimate. The integration is represented mathematically as:

$$\overline{C(t)} = \frac{1}{N}\sum_{N} C_n(t) \tag{3}$$

Depth Estimation Error Analysis

In order to ensure the accuracy of the detonation depth estimate, error bounds are derived from frequency estimation techniques. In high signal to noise ratio (SNR) cases, a relatively simple method of determining the resolution lower bound is called the Cramer-Rao bound. In frequency estimation, for a deterministic signal in the presence of band limited Gaussian white noise, the Cramer-Rao bound is expressed as follows:

$$\sigma^2(f) \geq \frac{3}{\pi^2 t_p^2 (2E/N_0)} \tag{4}$$

Adapting the Cramer-Rao bound to quefrency estimation, C(t) is substituted for f and the effective bandwidth $\beta_e$ for the pulse length $t_p$ resulting in the following equation:

$$\sigma^2(C(t)) = \frac{3}{\pi^2 \beta_e^{\,2} (2E/N_0)} \tag{5}$$

The effective bandwidth is defined as:

$$\beta_e^2 = \frac{\int_{-\infty}^{\infty} (2\pi f)^2 |S(f)|^2 df}{\int_{-\infty}^{\infty} |S(f)|^2 df}, \tag{6}$$

where S(η) is the averaged power spectrum of reverberation.

The receiver output signal to noise ratio ($2E/N_0$) is determined by calculating the detection index d as follows:

$$d = \frac{[M_{S+N} - M_N]^2}{\sigma_N^2} = SNR_{out} \tag{7}$$

The detection index is equal to the signal-to-noise to noise ratio at the envelope of the receiver output. $M_{S+N}$ is the peak signal in the cepstrum peak search window while $M_N$ is the mean noise and $\sigma_N$ is noise variance calculated from the quefrency ensemble outside the cepstrum peak search window. For a signal known exactly in a Gaussian noise background, it was found by Peterson and Birdsall that the detection index is $$d = 2E/N_0 \tag{8}$$

Consequently, the detection index equals the SNR at the envelope of the receiver output. To get the SNR of the input a simplifying assumption is made that the signal power is distributed uniformly across the measurement interval. This assumption makes the input SNR equal to $$SNR_{in} = d/\sqrt{N} = SNR_{out}/\sqrt{N}$$

The variance $\sigma_1^2$ for a single scan is then calculated using the input SNR. Finally, the output variance is obtained by dividing the input variance by N. The result is that as the signal-to-noise ratio is increased with averaging; the depth estimation error is decreased, resulting in a much more accurate estimate than what would be obtained in a single scan.

The error bound is presented to the user as ±σ in feet. This formulation agrees with the intuition that the measurement error is inversely proportional to both SNR and Bandwidth.

Hardware Implementation

In a preferred embodiment according to the present invention, the Depth Estimation Algorithm is implemented on a Low Cost Acoustic Processor Plus (LCAP+) 100. LCAP+100 is a system that allows for the recording, processing and display of sonobuoy acoustic data on a mobile platform such as a P3 military aircraft. The main components of the LCAP+ 100 system are a Low Cost Acoustic Processor (LCAP) 102 and an Auxiliary Data Processing Unit (ADPU) 104. LCAP 102 provides recording and "real-time" signal processing of digital and analog data from sonobuoys. In a typical implementation, acoustic data is provided to LCAP 102 via AN/ARR-78 receivers (not illustrated) onboard the P3. Buoy deployment, navigation data, legacy contact data and other legacy information is provided via Navy Tactical Data System (NTDS) taps between a System Controller (SC) 106 and a Tactical Computer (TC) 108 onboard anti-submarine warfare (ASW) aircraft such as the Navy P-3.

The LCAP 102 is housed in a rugged 19" rack mountable chassis with an integrated liquid crystal display (LCD), keyboard and trackball (not illustrated). It has two Digital AcQuisition (DAQ) cards (not illustrated) with 16 digital input channels each that are used to receive digital buoy acoustic data from a sonobuoy receiver 114 such as the AN/ARR-78 Advanced Sonobuoy Communications Link (ASCL), or similar. LCAP processor 102 also has a single 32 channel Analog to Digital card (not illustrated) used to receive analog buoy acoustic data from the ASCL. An audio card provides an audio output which is used for a headset 107, while two available 100 Base-Tx Ethernet ports provide connectivity via an Ethernet switch 120 to the rest of the LCAP Plus system.

The ADPU 104 is a rugged rack mountable chassis connected to a Command Console that has an integrated display 103, and keyboard/trackball 105. The ADPU 104 contains two NTDS cards (not illustrated) that are used to receive tactical data from the System Controller (SC) 106 and the Tactical Computer (TC) 108. A Command Function Select/Command Signal Generator (CFS/CSG) Modem 110 is connected via a USB link in order to provide the capability to command digital and analog buoys. A serial port connection is used to receive GPS data from a Trimble TrimPak III GPS receiver 112.

Figure 5:
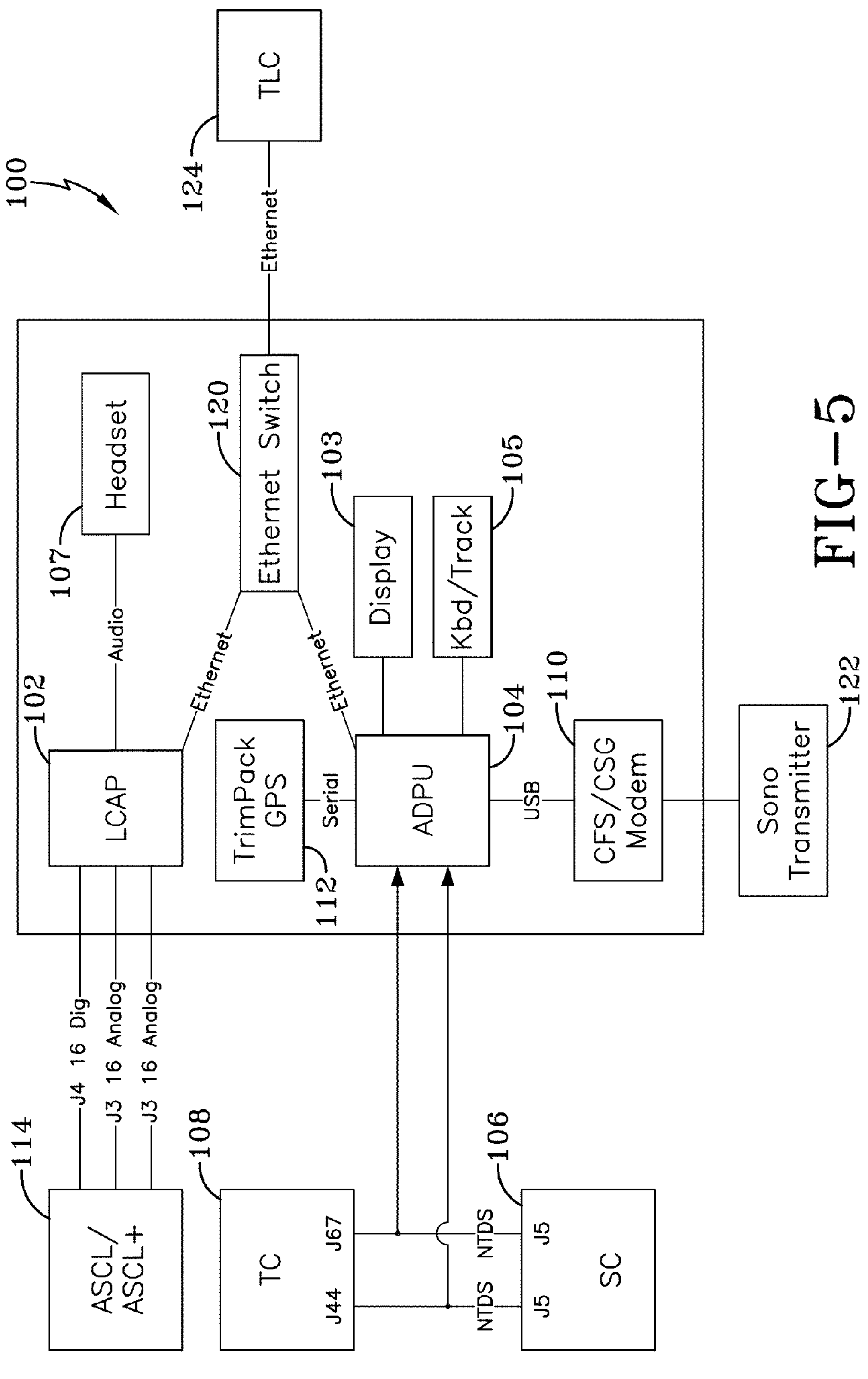
FIG. 5 is a simplified block diagram of LCAP+System Diagram.

The LCAP processor 102 integrates into the P3C's onboard aircraft as shown in FIG. 5. The LCAP processor 102 has several external interfaces used to either receive data or send data to other systems. LCAP 102 is connected to the ASCL Sonobuoy radio 114 via two J3 cables carrying analog acoustic data from the ASCL, and a single J4 cable that brings digital acoustic data into the LCAP. The CFS/CSG Modem 110 is used to send sonobuoy commands to digital and analog sonobuoys. It is controlled by a USB connection, and outputs modulated data to a Sono Transmitter 122 to be down linked to the buoys. The TrimPak GPS 112 is connected to an external GPS antenna and receives GPS data that is passed to the ADPU 104 via a serial connection. The ADPU 104 has Naval Tactical Data System (NTDS) cards which are connected to the SC 106/TC 108 using passive T taps on the NTDS interfaces. In this way, tactical data is passively received and stored by the ADPU 104. A Tactical Link Controller (TLC) 124 is connected to the LCAP 102 via an Ethernet connection. TLC 124 requests information from the Processing Option Control (POC) (not illustrated) regarding current buoy inventory and recorder configuration via the Common Object Request Broker Architecture (CORBA). Based on that information TLC 124 reads raw acoustic data over the Ethernet from the ADPU 104.

Results

Experimental data was gathered on the DEER Shakedown test which was held on 1 Jun. 2006. The test site was located in the Atlantic Ocean approximately 1200 miles southeast of Cape Hatteras, N.C. The ocean depth at this location was approximately 20 thousand feet. Multiple sound underwater signal (SUS) charges were dropped from a U.S. Navy P3 aircraft set to detonate at three depths; 300, 14,000 and 16,000 feet. The number of charges deployed at each depth ranged between 13 and 17.

Figure 6:
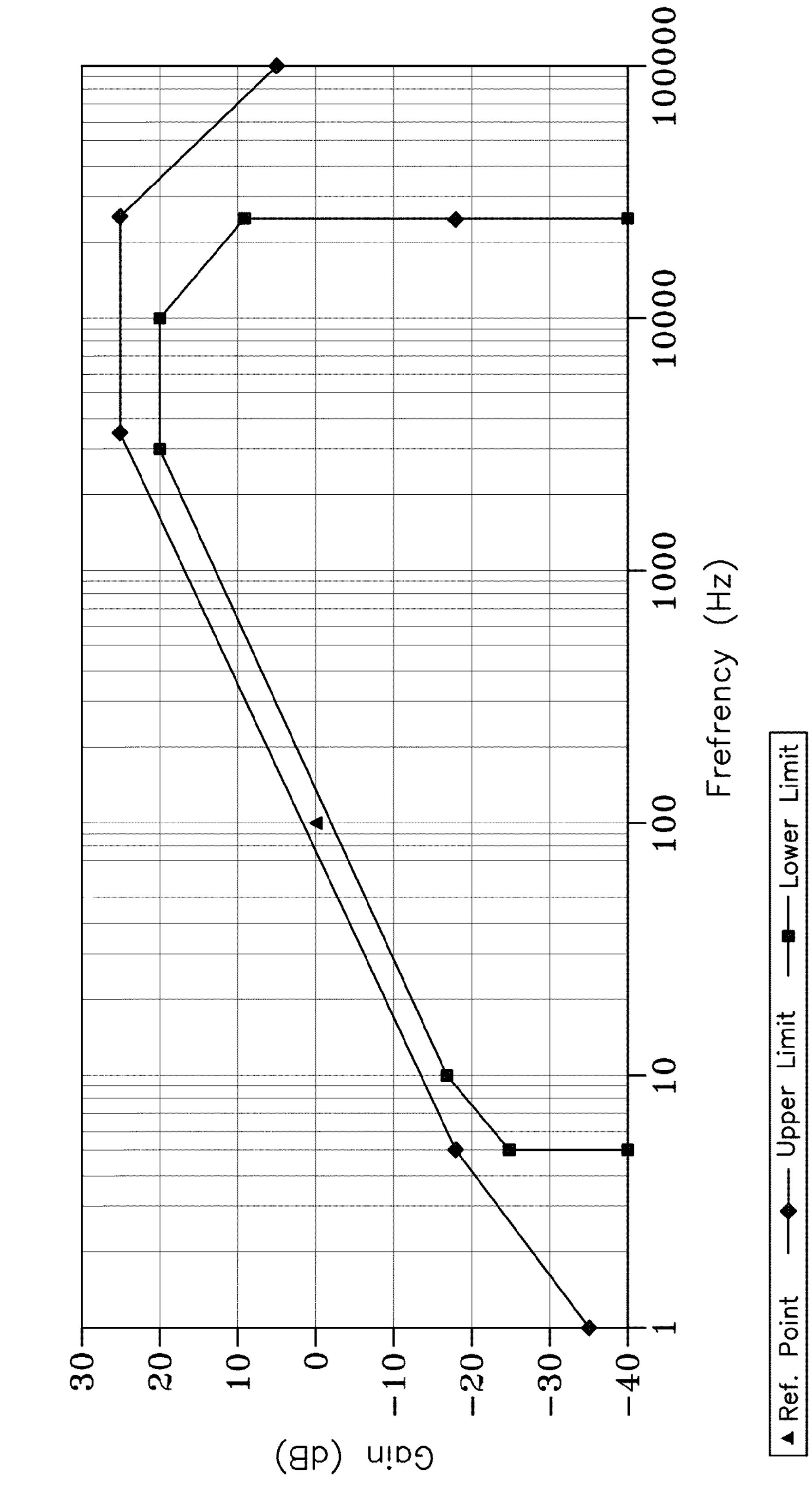
FIG. 6 is a plot of a Sonic System Response for the DIFAR AN/SSQ-53F Calibrated Omni Sonobuoy.
Figure 7:
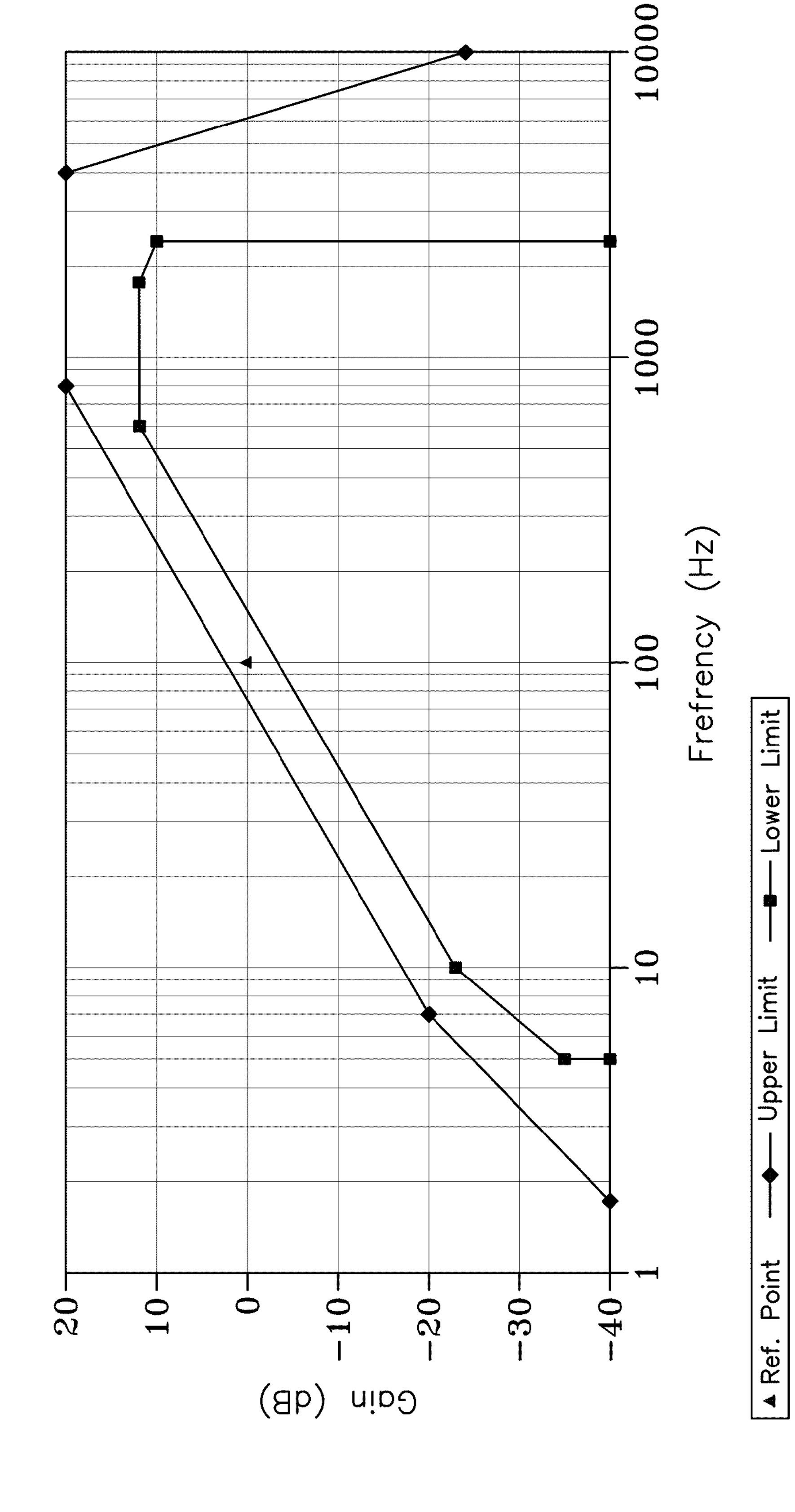
FIG. 7 is a plot of a Sonic System Response for the DIFAR AN/SSQ-53F Standard Mode Sonobuoy.

Depth estimation results were obtained on four independent sonobuoys. All four of these buoys were type AN/SSQ-53 Directional Frequency Analysis and Recording (DIFAR). Two of the four (RF 4 and RF 70) were deployed in the calibrated omni mode while the other two (RF 71 and RF 73) were deployed in standard DIFAR mode. The calibrated omni DIFAR sonobuoys have a bandwidth of 20 kHz while the standard DIFAR sonobuoys have a bandwidth of 2.5 kHz. See FIG. 6 for a plot of the DIFAR Calibrated Omni sonic response and FIG. 7 for a plot of the sonic response of the Standard DIFAR mode sonobuoy.

Figure 8:
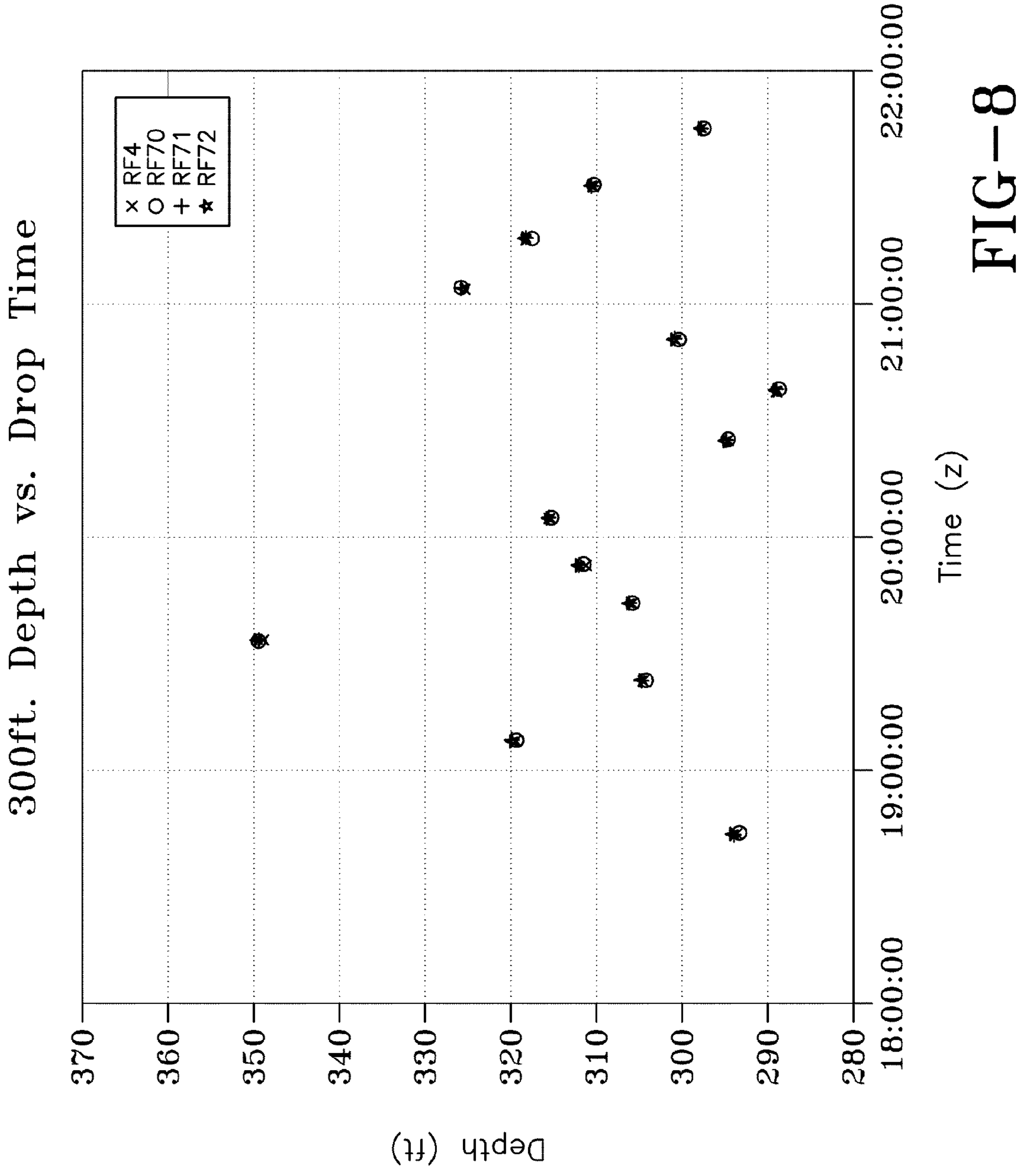
FIG. 8 is a plot of Depth Estimation Results for the 300 foot 1.8 lb SUS Charges.

The 300 foot depth estimation results are shown in FIG. 8. The depth estimates range from 290 to 350 feet. The most significant observation is that the depth estimates track very closely from sensor to sensor. On this scale, the sensor-to-sensor differences are imperceptible. The bubble period resulting from a 1.8 lb SUS at this depth is approximately 41 ms. This bubble period results in a spectral modulation of 25 Hz. This period is easily measurable with either the 2.5 or 20 kHz sensors.

Figure 9:
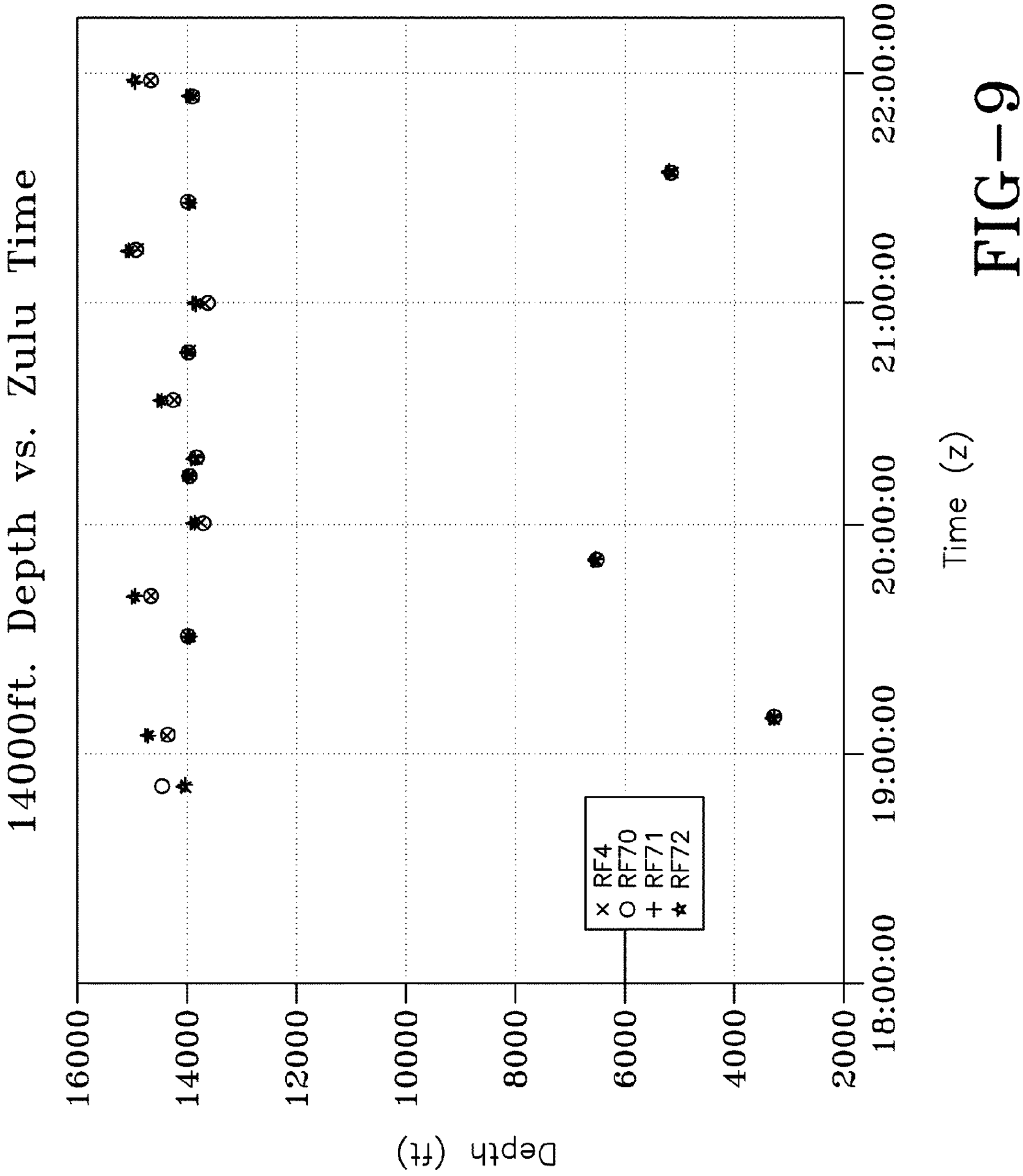
FIG. 9 is a plot of Depth Estimation results for the 14,000 foot 4 lb SUS Charges.

The 14 thousand foot depth estimation results are shown in FIG. 9. It is immediately apparent that three of the charges went off prematurely. For the charges that detonated close to the expected depth, the sensor-to-sensor depth agreement is not as good as the 300 foot example. The deeper depths require more bandwidth because the bubble period is much shorter. Consequently, at this depth, the 20 kHz receivers (RF 4 and 70) provide better resolution than the 2.5 kHz receivers (RF 71 and 73)

Figure 10:
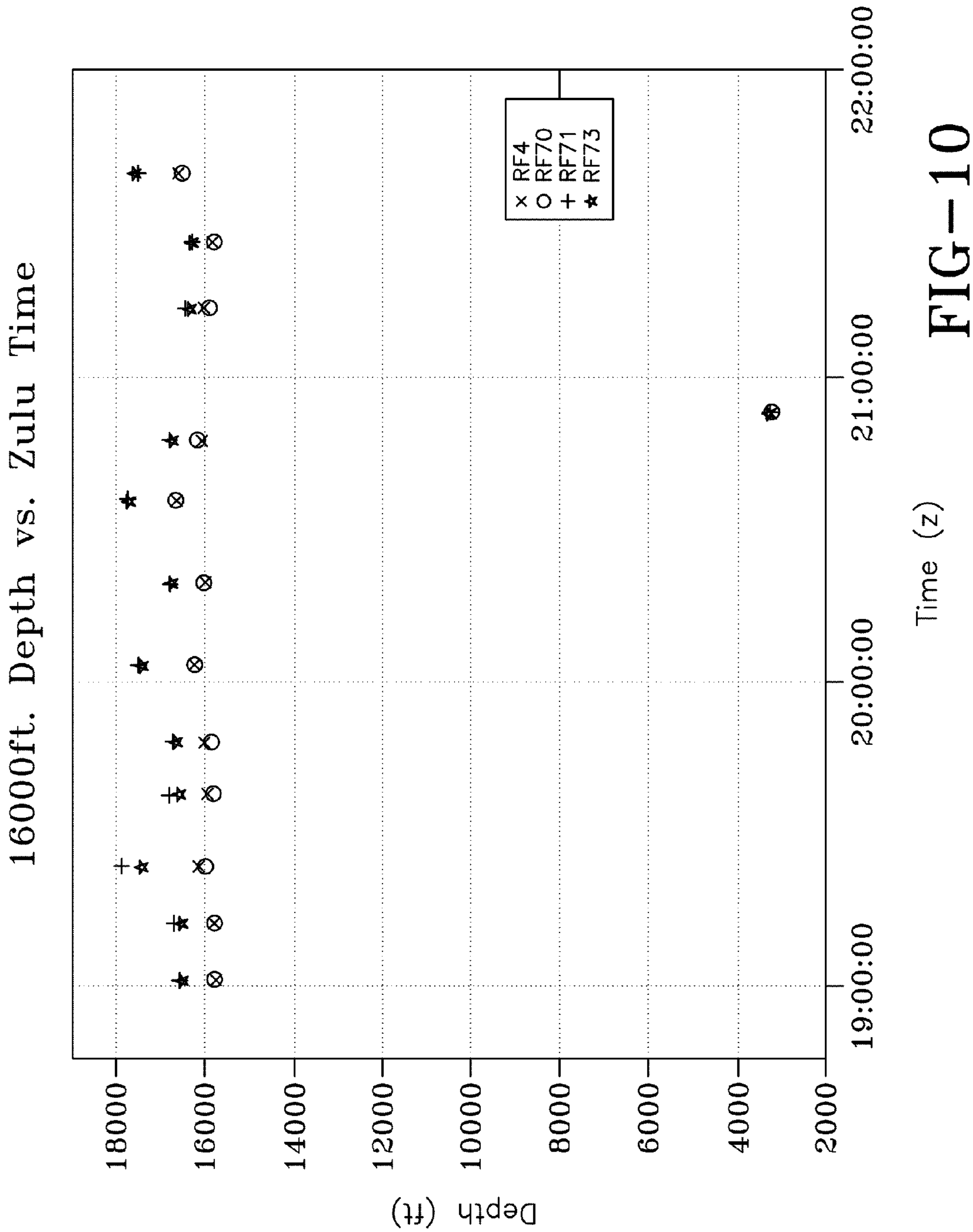
FIG. 10 is a plot of Depth Estimation Results for the 16,000 foot 4 lb SUS Charges.

The 16 thousand foot charges are shown in FIG. 10. This depth group had only one malfunctioning charge. It is also interesting to note that the depth estimates from the narrow bandwidth sensors diverge from the broader bandwidth sensors. At this depth, the 2.5 kHz sensors do not have enough bandwidth to measure the shorter bubble period. The expected bubble period should be taken into account when selecting the appropriate bandwidth for the receiver. As a general rule, the bandwidth of the receiver should be five times larger than the reciprocal of the expected bubble period.

Embodiments according to the present invention provide a depth estimate technique that offers a much higher degree of accuracy than previous methods and can be performed on site, i.e., while the test is in progress. Previous methods rely on multipath structures of the signal which for many operations is difficult because of the dynamic range of the sonobuoys.

Embodiments according to the present invention may also be used to determine whether an explosive line charge has final property at the correct explosive depth. An explosive line charge has a bubble period depth relationship which is different from that of a point charge.

$$T_L = \frac{K(w/L)^{1/2}}{(d+33)} \tag{10}$$

Where; K=a constant depending on source material and particular array design, w=change weight in pounds, L=length of change in feet and d=depth. For the source depth and weight a line change will have different bubble pulse period which can be measured so the single analysis discussed alone can be applied. In addition, if the line charge does not deploy properly, i.e., do not unfold the bubble pulse frequency will be that of a point thus providing a failure mode analysis. For a line charge with a center fired detonator, it is possible that half the charge will deploy while the other half will not, again providing a failure analysis mode.

CONCLUSION

As has been shown, embodiments according to the invention may be used to effectively estimate the depth at which an impulse acoustic source, such as an explosive charge, is activated under water. Accordingly, the scope of the invention should be determined by the following claims and their legal equivalents.

What is claimed is:

1. A method for estimating the depth at which an underwater impulse acoustic source is activated, comprising:

hydroacoustically recording sounds produced by activation of an underwater impulse acoustic source over a time period sufficient to capture reverberation;

performing a plurality of cepstral scans of the recording and averaging the plurality of cepstral scans to determine an average quefrequency corresponding to the impulse from the underwater impulse acoustic source; and deriving a depth estimate from the average quefrequency corresponding to the impulse from the underwater impulse acoustic source.

2. The method according to claim 1, wherein deriving a depth estimate from the average quefrequency corresponding to the impulse from the underwater impulse acoustic source comprises $$d = \left[\frac{Kw(1/3)}{T}\right]^{6/5} - 33$$

where w equals charge weight in pounds, T is the bubble pulse period, d is the depth of the underwater impulse acoustic source and K is dependent on the composition of explosive material used to produce the acoustic impulse.

3. The method according to claim 2 further comprising determining error bounds for estimating the depth at which an underwater impulse acoustic source is activated.

4. The method according to claim 3 wherein determining error bounds for estimating the depth at which an underwater impulse acoustic source is activated comprises determining a lower resolution bound by the Cramer-Rao method.

5. The method according to claim 1, wherein the underwater impulse acoustic source comprises a line charge.

6. The method according to claim 1, wherein the underwater impulse acoustic source comprises a point charge.

7. A system for estimating the depth at which an underwater impulse acoustic source is activated, comprising:

means for hydroacoustically recording sounds produced by activation of an underwater impulse acoustic source over a time period sufficient to capture a reverberation;

means for performing a plurality of cepstral scans of the recording to determine an average quefrequency corresponding to the impulse from the underwater impulse acoustic source; and means for deriving a depth estimate from the average quefrequency corresponding to the impulse from the underwater impulse acoustic source.

8. A system for estimating the depth at which an underwater impulse acoustic source is activated, comprising:

a sonobuoy receiver to receive sonobuoy hydroacoustic data comprising sounds produced by activation of an underwater impulse acoustic source;

a digital recorder to record the sounds produced by activation of the underwater impulse acoustic source and reverberations therefrom;

a signal processor for performing a plurality of cepstral scans of the recorded sounds to determine a quefrequency corresponding to the impulse from the underwater impulse acoustic source and for averaging the plurality of cepstral scans to determine an average quefrequency to derive a depth estimate from the average quefrequency corresponding to the impulse from the underwater impulse acoustic source; and a display for indicating the depth estimate from the average quefrequency corresponding to the impulse from the underwater impulse acoustic source.

* * * * *